(12) United States Patent
Lee

(10) Patent No.: US 11,447,043 B2
(45) Date of Patent: Sep. 20, 2022

(54) SEAT OPERATION RANGE SETTING SYSTEM

(71) Applicant: HYUNDAI TRANSYS INC., Chungcheongnam-do (KR)

(72) Inventor: Jin Woo Lee, Gyeonggi-do (KR)

(73) Assignee: HYUNDAI TRANSYS INC., Chungcheongnam-Do (KR)

( * ) Notice: Subject to any disclaimer, the term of this patent is extended or adjusted under 35 U.S.C. 154(b) by 22 days.

(21) Appl. No.: 17/095,114

(22) Filed: Nov. 11, 2020

(65) Prior Publication Data
US 2021/0155123 A1    May 27, 2021

(30) Foreign Application Priority Data

Nov. 21, 2019  (KR) .................. 10-2019-0150439

(51) Int. Cl.
*B60N 2/08* (2006.01)
*B60N 2/02* (2006.01)

(52) U.S. Cl.
CPC ......... *B60N 2/0881* (2013.01); *B60N 2/0232* (2013.01); *B60N 2/0244* (2013.01); *B60N 2002/0272* (2013.01)

(58) Field of Classification Search
CPC ...... B60N 2/0881; B60N 2/06; B60N 2/0232; B60N 2/0244; B60N 2002/0272
See application file for complete search history.

(56) References Cited

U.S. PATENT DOCUMENTS

| | | | | |
|---|---|---|---|---|
| 6,943,516 | B2 * | 9/2005 | Woller | B60N 2/06 318/467 |
| 7,009,386 | B2 * | 3/2006 | Tromblee | G01D 5/2497 324/207.2 |
| 7,330,008 | B2 * | 2/2008 | Lee | B60R 21/01554 318/467 |
| 9,975,453 | B2 * | 5/2018 | Lee | B60N 2/0228 |
| 10,011,241 | B2 * | 7/2018 | Lanter | B60N 2/06 |
| 10,293,711 | B2 * | 5/2019 | Lee | B60N 2/12 |
| 10,940,819 | B2 * | 3/2021 | Zaugg | B60N 2/06 |
| 2013/0049669 | A1 * | 2/2013 | Han | B60N 2/06 318/565 |
| 2013/0154534 | A1 * | 6/2013 | Okada | B60N 2/0232 318/490 |

(Continued)

FOREIGN PATENT DOCUMENTS

| | | |
|---|---|---|
| JP | 2001334907 A | 12/2001 |
| JP | 2004210170 A | 7/2004 |

(Continued)

OTHER PUBLICATIONS

Extended European Search Report dated Mar. 19, 2021; Appln. No. 20208049.5.

*Primary Examiner* — Philip F Gabler

(57) ABSTRACT

The present disclosure relates to a seat operation range setting system. The seat operation range setting system includes a lower rail disposed on a frame mounted to a floor panel of a chassis, an upper rail installed so as to be slidable along the lower rail, a contactless sensor connected to the upper rail, the contactless sensor being configured to sense a bracket disposed at one side of the lower rail, and a controller configured to receive an ON/OFF signal of the contactless sensor and to set a virtual limit of a seat.

13 Claims, 4 Drawing Sheets

(56) References Cited

U.S. PATENT DOCUMENTS

2017/0305304 A1   10/2017  Koh et al.
2018/0148011 A1*   5/2018  Zaugg .................... B60N 2/06
2020/0189419 A1*   6/2020  Lee ..................... B60N 2/0228
2021/0155121 A1*   5/2021  Byun .................. B60N 2/0232

FOREIGN PATENT DOCUMENTS

KR    1020150089317 A    8/2015
KR    1020160081475 A    7/2016

* cited by examiner

SEAT OPERATION RANGE SETTING SYSTEM

CROSS-REFERENCE TO RELATED APPLICATION

This application claims, under 35 U.S.C. § 119(a), the benefit of priority to Korean Patent Application No. 10-2019-0150439 filed on Nov. 21, 2019, the entire contents of which are incorporated herein by reference.

BACKGROUND

(a) Technical Field

The present disclosure relates to a seat operation range setting system capable of setting a virtual limit of a seat using a contactless sensor.

(b) Background Art

In general, a vehicle is provided with various convenience apparatuses configured to improve driver or passenger convenience. An example thereof is a power seat. The power seat is configured such that a seat position adjusted based on the shape of a specific driver is memorized in advance and the seat position is adjusted to the memorized seat position by simply manipulating a memory recall button. That is, the current seat position can be conveniently adjusted to the memorized seat position by simply manipulating the memory recall button without newly adjusting the seat position varying depending on the driver. In order to control the position of the power seat, it is necessary to detect the number of rotations of a motor. To this end, a ring magnet configured to rotate with a rotary shaft of the motor and a lead switch or a Hall sensor are used. A power seat control unit controls only the position of the power seat by counting pulse waveforms of the motor generated by the Hall sensor or the lead switch.

Meanwhile, the power seat is pinched by a structure when sliding to the end. When the seat is pinched, the seat does not normally move even though a switch is manipulated. Consequently, a virtual limit to which the seat is movable is set in order to prevent the seat from being pinched or from being separated from a rail. In a conventional slide frame structure, an overlap is provided between an upper rail and a lower rail, whereby sliding to the end is possible. In the case of a new power frame, however, the seat may be separated from the rail at the frontmost of the frame at the time of vehicle collision, since the overlap between the upper rail and the lower rail is small when moving to the frontmost due to the characteristics of the frame. Consequently, there is a need to newly set a limit to which the seat is movable depending on a change in rail structure of the seat.

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a seat operation range setting system capable of setting a virtual limit to a regular position using a contactless sensor.

It is another object of the present invention to provide a seat operation range setting system capable of changing a virtual limit by simultaneously using a contactless sensor and a Hall sensor.

In one aspect, the present invention provides a seat operation range setting system including a lower rail disposed on a frame mounted to a floor panel of a chassis, an upper rail installed so as to be slidable along the lower rail, a contactless sensor connected to the upper rail, the contactless sensor being configured to sense a bracket disposed at one side of the lower rail, and a controller configured to receive an ON/OFF signal of the contactless sensor and to set a virtual limit of a seat.

In an example, the controller may recognize a point at which a signal of the contactless sensor is changed from an ON state to an OFF state or a point at which the signal of the contactless sensor is changed from the OFF state to the ON state as a physical end to which the seat is movable, and may set the virtual limit based on the physical end.

In an example, the seat operation range setting system may further include a motor configured to drive the seat and a Hall sensor configured to output a pulse based on the rotation amount of the motor.

In an example, in the case in which a rear virtual limit of the seat is initially set, the controller may store the number of pulses output by the Hall sensor when the seat moves from the physically rearmost position of the seat to the position at which the signal of the contactless sensor is changed from the ON state to the OFF state.

In an example, the controller may set a position compensated for by a predetermined first number of pulses based on the physical end as the virtual limit.

In an example, in the case in which the Hall sensor malfunctions, the controller may update the virtual limit when the seat moves from a position ahead of the virtual limit by a predetermined second number of pulses in a direction toward the virtual limit, and the case in which the Hall sensor malfunctions may mean the case in which the seat reaches the physical end or the case in which the seat is pinched.

In an example, the virtual limit may include a front virtual limit and a rear virtual limit based on the position of the seat, and in the case in which one of the front virtual limit and the rear virtual limit is updated, the controller may also update the other of the front virtual limit and the rear virtual limit.

In an example, the controller may estimate the distance between the front virtual limit and the rear virtual limit based on the number of pulses output by the Hall sensor, and in the case in which one of the front virtual limit and the rear virtual limit is updated, the controller may also update the other of the front virtual limit and the rear virtual limit based on the estimated distance between the front virtual limit and the rear virtual limit.

In an example, in the case in which the Hall sensor malfunctions at a point deviating from the position ahead of the virtual limit by the second number of pulses, the controller may ignore malfunction of the Hall sensor and may maintain a previous virtual limit.

In an example, the controller may recognize a point at which the Hall sensor malfunctions as the physical end, and may update the previous virtual limit based on the physical end.

In an example, the contactless sensor may output an ON signal upon sensing the bracket.

In an example, the bracket may have a shape extending in a direction in which the lower rail extends, and the extension length of the bracket may be less than the extension length of the lower rail.

In an example, the controller may set the distance between the front virtual limit and the rear virtual limit based on the extension length of the bracket.

In an example, the controller may set a range within which the contactless sensor senses the bracket as a seat operation range, and the controller may set the virtual limit based on the seat operation range.

In an example, the seat operation range may mean a physical end to which the seat is movable.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
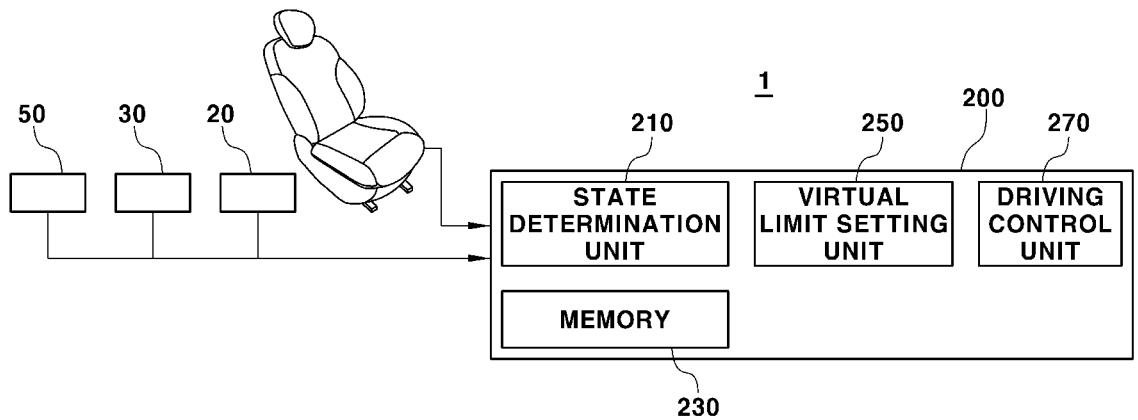
FIG. 1 is a view showing a seat operation range setting system according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Advantages and features of the present invention and methods for achieving the same will be clearly understood with reference to the following detailed description of embodiments in conjunction with the accompanying drawings. However, the present invention is not limited to the embodiments disclosed herein and may be implemented in various different forms. The embodiments are merely given to make the disclosure of the present invention perfect and to perfectly instruct the scope of the invention to those skilled in the art, and the present invention should be defined by the scope of claims. Like reference numbers refer to like elements throughout the specification.

The term "unit" or "module" used in this specification signifies one unit that processes at least one function or operation, and may be realized by hardware, software, or a combination thereof.

In addition, the terms "first" and "second" are used in this specification only to distinguish between the same elements, and the elements are not limited as to the sequence therebetween in the following description.

The above detailed description illustrates the present invention. In addition, the foregoing describes exemplary embodiments of the present invention. The present invention may be used in various different combinations, changes, and environments. That is, variations or modifications can be made within the conceptual scope of the present invention, equivalents to the disclosure of the present invention, and/or the scope of technology and knowledge in the art to which the present invention pertains. The embodiments describe the best mode for realizing the technical concept of the present invention, and variations required for the concrete application and use of the present invention are possible. Therefore, the above detailed description does not limit the present invention disclosed above. In addition, the appended claims should be interpreted to include other embodiments.

Figure 2:
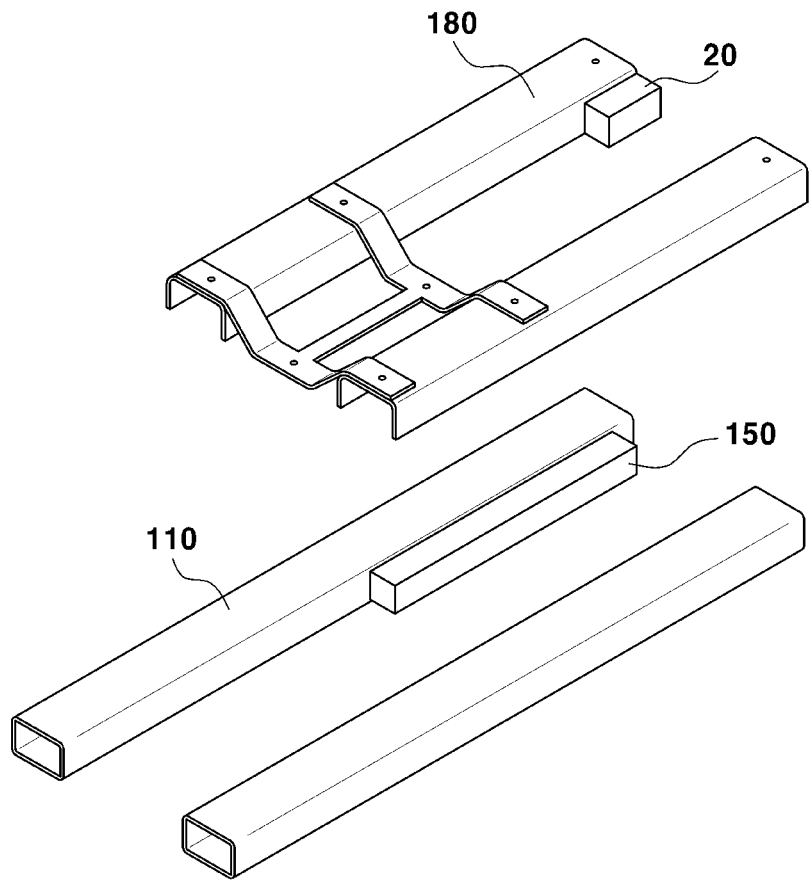
FIG. 2 is a view illustrating the positional relationship between a contactless sensor and a bracket according to an embodiment of the present invention.

FIG. 1 is a view showing a seat operation range setting system according to an embodiment of the present invention, and FIG. 2 is a view illustrating the positional relationship between a contactless sensor and a bracket according to an embodiment of the present invention.

Referring to FIGS. 1 and 2, the seat operation range setting system 1 may include a seat 10, a contactless sensor 20, a Hall sensor 30, a motor 50, and a controller 200. The contactless sensor 20 and the Hall sensor 30 may be attached to the seat 10.

The contactless sensor 20 may be attached to one side of an upper rail 180. The upper rail 180 may be installed so as to be slidable along a lower rail 110. The upper rail 180 may be connected to the seat 10, and may guide forward or rearward movement of the seat 10. That is, the seat 10 may be driven by the motor 50, and may move in a direction in which each of the lower rail 110 and the upper rail 180 extends. The lower rail 110 may be disposed on a frame (not shown) mounted to a floor panel of a chassis. However, the lower rail 110 may be integrally formed with the frame (not shown). The lower rail 110 and the upper rail 180 may extend in one direction. As the upper rail 180 moves to the front of the seat 10, the overlap between the upper rail 180 and the lower rail 110 may be reduced. As a result, rigidity of each rail may be reduced, and when vehicle collision occurs, the lower rail 110 and the upper rail 180 may be separated from each other, whereby a person may be injured. Consequently, it is necessary to set a range within which the upper rail 180 is slidable.

A bracket 150 may be provided at one side of the lower rail 110. The bracket 150 may have a shape extending in the direction in which the lower rail 110 extends. The extension length of the bracket 150 may be less than the extension length of the lower rail 110. For example, the length of the lower rail 110 may be about 290 mm, and the length of the bracket 150 may be about 100 mm. The contactless sensor 20 may sense the bracket 150. The upper rail 180 may move on the lower rail 110 such that the contactless sensor 20 can sense the bracket 150. The contactless sensor 20 and the bracket 150 may be disposed so as to overlap each other in a vertical direction. The vertical direction may mean a direction from the lower rail 110 toward the upper rail 180.

When sensing the bracket 150, the contactless sensor 20 may output an ON state signal. When not sensing the bracket 150, the contactless sensor 20 may output an OFF state signal. The signal output by the contactless sensor 20 may be transmitted to the controller 200.

The Hall sensor 30 may output a pulse according to rotation of the motor 50. Whenever sensing one revolution of a rotor of the motor 50, the Hall sensor 30 may generated Hall voltage, and may output the generated Hall voltage as a pulse signal. The position and movement distance of the seat 10 may be estimated depending on the number of pulses output by the Hall sensor 30. The position and movement distance of the seat 10 may be estimated by the controller 200.

The controller 200 may set a virtual limit, which is an operation limit of the seat 10, based on information measured by the contactless sensor 20 and the Hall sensor 30. The controller 200 may set the virtual limit of the seat 10 based on the ON state signal and the OFF state signal output by the contactless sensor 20. The virtual limit may include a front virtual limit and a rear virtual limit based on the position of the seat 10. That is, the front virtual limit may be a limit point of a seat operation range set at the front of the seat 10, and the rear virtual limit may be a limit point of the seat operation range set at the rear of the seat 10. The contactless sensor 20 may transmit an ON state signal indicating sensing of the bracket 150 to the controller 200. In the case in which the contactless sensor 20 does not sense the bracket 150 as the result of movement of the upper rail 180, the contactless sensor 20 may transmit an OFF state signal to the controller 200. The contactless sensor 20 may transmit the ON state signal and the OFF state signal to the controller 20 in real time, and the controller 20 may recognize that the signal received from the contactless sensor 20 is changed from the ON state signal to the OFF state signal or from the OFF state signal to the ON state signal. That is, the controller 200 may recognize the point at which the signal received from the contactless sensor 20 is changed from the ON state signal to the OFF state signal or from the OFF state signal to the ON state signal as a limit point (a physical end) to which the seat 10 is physically movable. The controller 200 may set the virtual limit based on the recognized physical end. The controller 200 may set a position ahead of the physical end by a predetermined number of pulses as the virtual limit. At this time, the position ahead of the physical end may be within a range within which the contactless sensor 20 can recognize the bracket 150. For example, the predetermined number of pulses may be 9 pulses to 11 pulses.

The controller 200 may include a state determination unit 210, a memory 230, a virtual limit setting unit 250, and a driving control unit 270.

The state determination unit 210 may determine whether the seat 10 is located within the seat operation range based on a signal of the contactless sensor 20 and whether the seat 10 has reached the physical end for virtual limit determination. In addition, the state determination unit 210 may estimate the position and movement distance of the seat 10 based on the number of pulses measured by the Hall sensor 30.

The memory 230 may store various kinds of information, such as the position of the seat 10 determined by the state determination unit 210, the movement distance of the seat 10, and the distance between the front virtual limit and the rear virtual limit. In addition, the memory 230 may store the distance from the set virtual limit to the physical end of the seat 10. The distance between the virtual limit and the physical end may be derived based on the number of pulses output by the Hall sensor 30.

The virtual limit setting unit 250 may set the virtual limit based on a signal sensed by the contactless sensor 20, and may update the virtual limit based on the number of pulses transmitted by the Hall sensor 30, data stored in the memory, and a predetermined virtual limit. In the case in which the Hall sensor 30 malfunctions, the virtual limit setting unit 250 may update the predetermined virtual limit. The case in which the Hall sensor 30 malfunctions may mean the case in which the seat 10 reaches the physical end or the case in which the seat 10 is pinched. The virtual limit setting unit 250 may recognize a point at which the Hall sensor 30 malfunctions as the physical end, and may set a position ahead of the physical end by a predetermined number of pulses as a new virtual limit. At this time, the position ahead of the physical end may be within a range within which the contactless sensor 20 can recognize the bracket 150.

The driving control unit 270 may control driving of the seat 10 based on the set virtual limit. Specifically, the driving control unit 270 may control the rotation amount of the motor 50 based on the virtual limit, and may control the motor 50 such that the seat 10 moves between the front virtual limit and the rear virtual limit based on the current position of the seat 10 derived based on information measured by the Hall sensor 30. The driving control unit 270 may control the motor 50 such that the seat 10 moves between the front virtual limit and the rear virtual limit.

According to the embodiment of the present invention, it is possible to set the virtual limit at a regular position through the contactless sensor 20 even when impact is applied to a vehicle or the Hall sensor 30 malfunctions.

In addition, according to the embodiment of the present invention, the seat operation range setting system 1 is capable of accurately setting the seat operation range, whereby it is possible to prevent the seat 10 from being separated from the rail due to a change in the seat operation range even when impact is applied to the vehicle.

Figure 3:
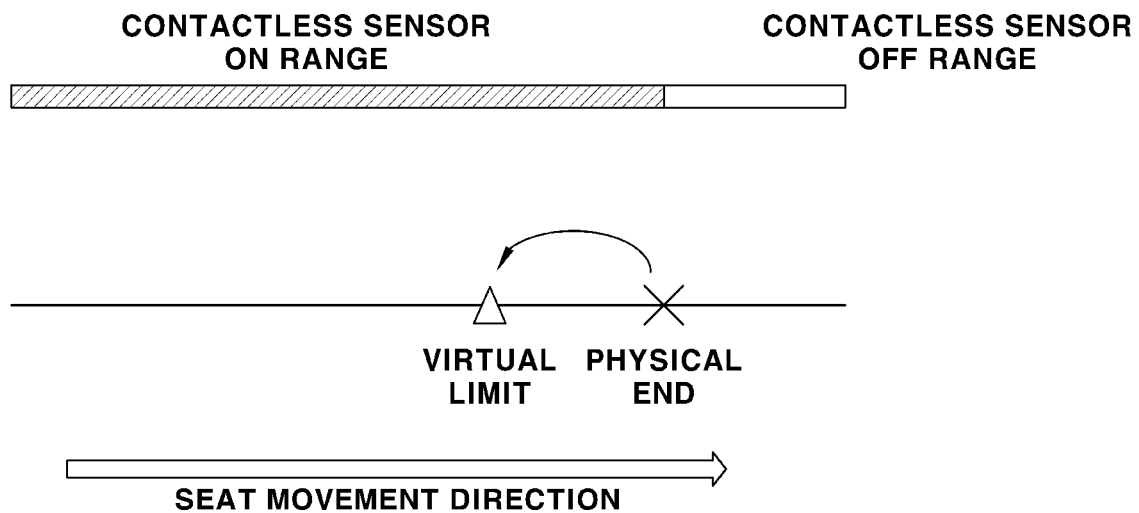
FIG. 3 is a view illustrating an example of setting a seat operation range according to an embodiment of the present invention.

FIG. 3 is a view illustrating an example of setting a seat operation range according to an embodiment of the present invention.

Referring to FIGS. 1 to 3, the upper rail 180 may move from the rear to the front of the seat 10, and the contactless sensor 20 may sense the bracket 150 during the movement from the rear to the front of the seat 10. The controller 200 may set the distance between the front virtual limit and the rear virtual limit based on the extension length of the bracket 150. That is, the controller 200 may set a range within which the contactless sensor 20 can sense the bracket 150 as a seat operation range, and may set the virtual limit based on the seat operation range.

As an example, the state determination unit 210 may recognize the point at which the signal output by the contactless sensor 20 is changed from the ON state signal to the OFF state signal as a physical end to which the seat 10 is movable. In actuality, the seat 10 is movable over the point at which the signal output by the contactless sensor 20 is changed from the ON state signal to the OFF state signal; however, the state determination unit 210 may recognize the point at which the signal output by the contactless sensor 20 is changed from the ON state signal to the OFF state signal as the physical end in order to prevent the seat 10 from being separated from the lower rail 110. The virtual limit setting unit 250 may set a position compensated for by a predetermined first number of pulses based on the physical end as the virtual limit. For example, the first number of pulses may be 9 pulses to 11 pulses. However, the first number of pulses may be changed by a designer. At this time, the virtual limit setting unit 250 may set a position at which the contactless sensor 20 can output an ON state signal as the virtual limit.

As an example, the upper rail 180 may move to the rearmost of the seat 10, and the contactless sensor 20 may sense the bracket 150 while the seat 10 moves to the rearmost. In the case in which the rear virtual limit of the seat 10 is initially set, the memory 230 may store the number of pulses output by the Hall sensor 30 when the seat 10 moves from the physically rearmost position of the seat 10 (a position at which hard stop occurs) to the position at which the signal of the contactless sensor 20 is changed from the ON state signal to the OFF state signal. The virtual limit setting unit 250 may set a position compensated for by the number of pulses based on the position at which the signal of the contactless sensor 20 is changed from the ON state signal to the OFF state signal as a rear virtual limit. The state determination unit 210 may estimate the distance from the physically rearmost position of the seat 10 to the rear virtual limit based on the number of pulses stored in the memory 230.

According to the embodiment of the present invention, the controller 200 may set the virtual limit based on the signal output by the contactless sensor 20. Also, even in the case in which the initial virtual limit of the seat 10 is set, the controller 200 may set the virtual limit based on the signal output by the contactless sensor 20. At this time, when the first number of pulses is small, hard stop may occur due to movement inertia. When the first number of pulses is large, the seat operation range is reduced. Consequently, the designer may set the first number of pulses in consideration of the above problems.

Figure 4:
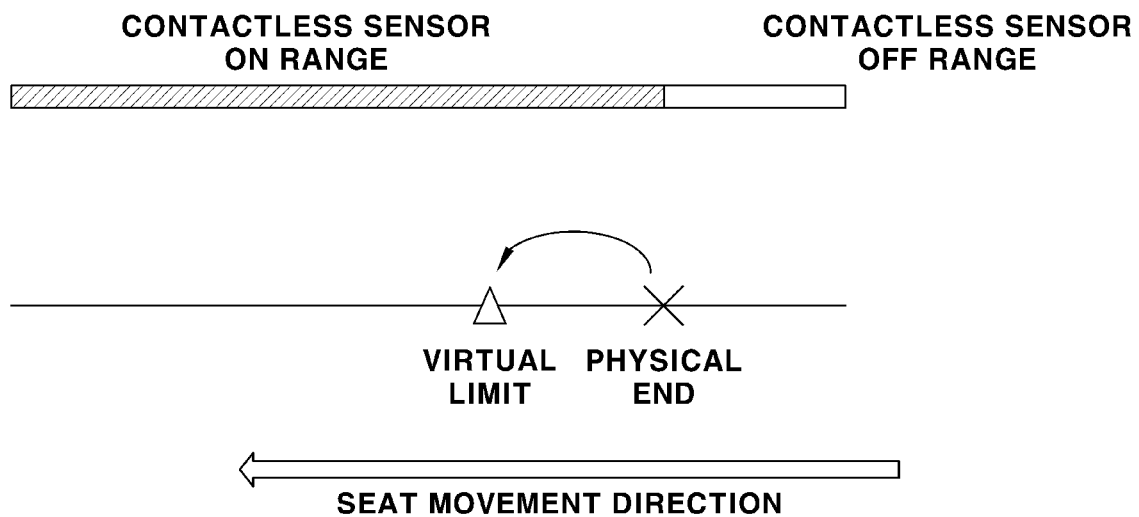
FIG. 4 is a view illustrating another example of setting the seat operation range according to the embodiment of the present invention.

FIG. 4 is a view illustrating another example of setting the seat operation range according to the embodiment of the present invention. A duplicate description will be omitted for simplicity of description.

Referring to FIGS. 1, 2, and 4, the upper rail 180 may move from the rear to the front of the seat 10, and the contactless sensor 20 may sense the bracket 150 during the movement from the rear to the front of the seat 10. The state determination unit 210 may recognize a point at which a signal of the contactless sensor 20 is changed from an ON state signal to an OFF state signal, in the same manner as in the embodiment of FIG. 3. However, a point at which a signal of the contactless sensor 20 is changed from an OFF state signal to an ON state signal is present while the seat 10 moves from the front to the rear. The virtual limit setting unit 250 may set a virtual limit based on the point at which the signal output by the contactless sensor 20 is changed from the OFF state signal to the ON state signal. The virtual limit setting unit 250 may determine whether a previously set virtual limit and a newly measured virtual limit are the same based on the position and movement distance of the seat 10 stored in the memory 230.

According to the embodiment of the present invention, the seat operation range setting system 1 is capable of setting the virtual limit at an exact position through repeated confirmation of and comparison between set virtual limits. Also, in the case in which the previously set virtual limit and the newly measured virtual limit are different from each other, the virtual limit setting unit 250 may control the seat 10 based on the newly measured virtual limit. Even in the case in which the seat 10 is dislocated due to external impact or malfunction of sensors or the position of the seat 10 is inaccurately measured, therefore, the seat operation range setting system 1 is capable of setting a virtual limit having a small error.

Figure 5:
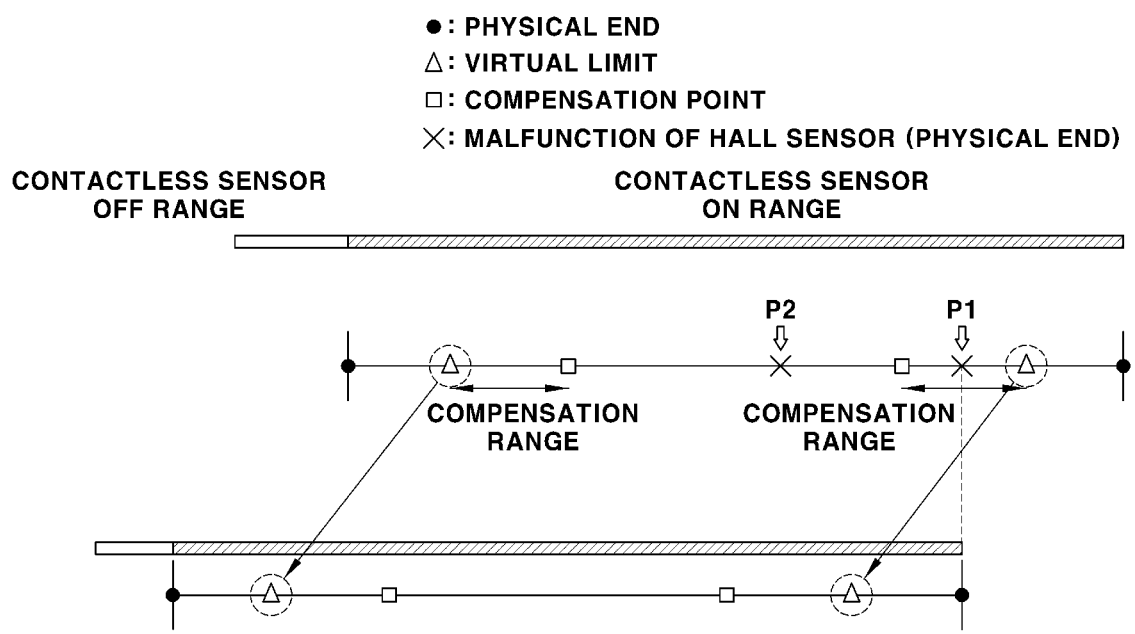
FIG. 5 is a view illustrating a method of updating a virtual limit by simultaneously using the contactless sensor and a Hall sensor according to an embodiment of the present invention.

FIG. 5 is a view illustrating a method of updating the virtual limit by simultaneously using the contactless sensor and the Hall sensor according to the embodiment of the present invention.

Referring to FIGS. 1 and 5, the controller 200 may update a previously set virtual limit. In order to update the virtual limit, the controller 200 may monitor whether the Hall sensor 30 malfunctions. The case in which the Hall sensor 30 malfunctions may mean the case in which the seat 10 reaches the physical end or the case in which the seat 10 is pinched. When the seat 10 reaches the physical end or when the seat 10 is pinched, the motor 50 configured to move the seat 10 is not rotated, and the Hall sensor 30 configured to sense rotation of the rotor of the motor 50 may malfunction. Consequently, the controller 200 may check the current state of the seat 10 based on whether the Hall sensor 30 malfunctions.

As an example, in the case in which the Hall sensor 30 malfunctions, the controller 200 may update the previous virtual limit when the seat 10 moves from a position P1 ahead of the previously set virtual limit by a predetermined second number of pulses in a direction toward the previous virtual limit for a predetermined time or longer. At this time, the position ahead of the previously set virtual limit may mean a position at which the contactless sensor 20 can output an ON state signal. That is, the controller 200 may set a compensation range from the previous virtual limit to the position P1 ahead of the previous virtual limit by the second number of pulses, and may update the virtual limit when the Hall sensor 30 malfunctions within the compensation range. For example, the second number of pulses may be about 25 pulses, and the predetermined time may be 1 second or more. That is, when the Hall sensor 30 malfunctions, the seat 10 may be estimated to be located at the physical end. In the case in which the seat 10 continuously moves from the point at which the Hall sensor 30 malfunctions in a direction toward the previous virtual limit, however, the seat 10 may be separated from the rail. Consequently, the state determination unit 210 of the controller 200 may determine that the point at which the Hall sensor 30 malfunctions is the physical end, and the virtual limit setting unit 250 may set a position ahead of the point at which the Hall sensor 30 malfunctions by a first number of pulses as a new virtual limit. The position of the newly set virtual limit may be a position at which the contactless sensor 20 outputs an ON state signal. The memory 230 may store information about the distance between the previous front virtual limit and the previous rear virtual limit based on the number of pulses output by the Hall sensor 30. The virtual limit setting unit 250 may estimate the distance between the previous front virtual limit and the previous rear virtual limit, and may update one of the front virtual limit and the rear virtual limit when the other is updated. For example, in the case in which the point at which the Hall sensor 30 malfunctions is a point adjacent to the front virtual limit, the virtual limit setting unit 250 may update the front virtual limit. At this time, the virtual limit setting unit 250 may update the rear virtual limit based on the position of the front virtual limit newly set based on information stored in the memory 230.

As an example, in the case in which the Hall sensor 30 malfunctions at a point P2 deviating from the position ahead of the previously set virtual limit by a predetermined second number of pulses, the controller 200 may ignore malfunction of the Hall sensor 30 and may maintain the previous virtual limit. In the case in which the Hall sensor 30 malfunctions within the compensation range based on the virtual limit, it may be reasonably suspected that the physical end has been changed or the position of the seat 10 has been abruptly changed by an external factor. In the case in which the Hall sensor 30 malfunctions at the point P2 outside the compensation range based on the virtual limit, however, the controller 200 may determine that the Hall sensor 30 malfunctions. Consequently, the controller 200 may not update the previous virtual limit.

According to the embodiment of the present invention, the controller 200 may recognize the point at which the Hall sensor 30 malfunctions as the physical end to which the seat 10 is movable, and may update the previous virtual limit based on the physical end. Even in the case in which the Hall sensor 30 malfunctions or the position of the seat 10 is abruptly changed by an external factor, the controller 200 may determine whether the Hall sensor 30 malfunctions within the compensation range set based on the previous virtual limit, and may update the virtual limit or maintain the previous virtual limit based thereon. That is, the seat operation range setting system 1 according to the embodiment of the present invention may set a virtual limit having an error and an external factor applied to the seat 10 reflected therein.

Figure 6:
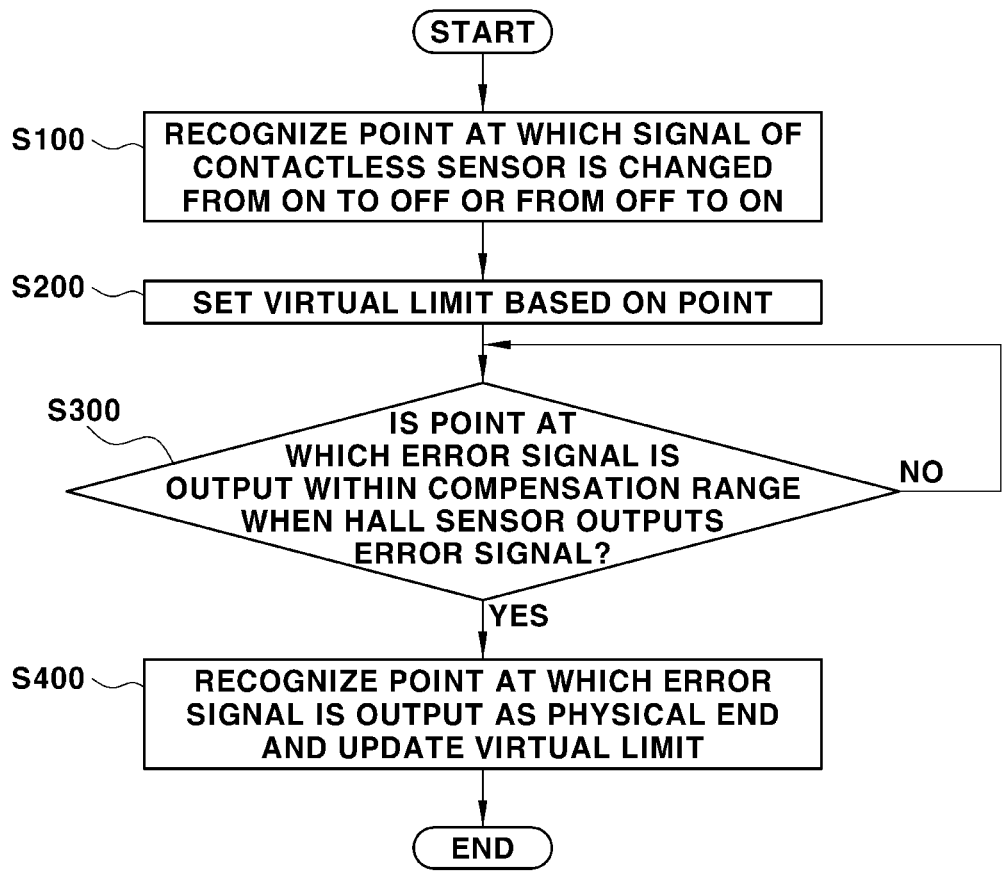
FIG. 6 is a flowchart showing a seat operation range setting method according to an embodiment of the present invention.

FIG. 6 is a flowchart showing a seat operation range setting method according to an embodiment of the present invention. A duplicate description will be omitted for simplicity of description.

Referring to FIG. 6, the contactless sensor attached to the upper rail may sense the bracket attached to the lower rail. The extension length of the bracket may be interpreted as limiting the seat operation range. That is, as the length of the bracket is increased, the seat operation range may be increased. The reason that the seat operation range is increased is that the contactless sensor may output an ON state signal for an increased time as the length of the bracket is increased. A point at which a signal of the contactless sensor is changed from ON to OFF or from OFF to ON may mean a point at which the seat movement is limited. Consequently, the controller may recognize the point as a physical end to which the seat is movable (S100).

The controller may set a virtual limit based on the point recognized as the physical end. The controller may set a position compensated for by a first number of pulses based on the point as the virtual limit. At this time, the position compensated for by the first number of pulses based on the point may mean a position at which the contactless sensor can output an ON state signal (S200).

The controller may monitor whether the Hall sensor malfunctions. The controller may update a previously set virtual limit based on whether the Hall sensor malfunctions. Specifically, when the Hall sensor outputs an error signal, the controller may determine whether a point at which the error signal is output is within a compensation range. The compensation range may mean a position ahead of the previously set virtual limit by a second number of pulses (S300).

In the case in which the point at which the error signal is output is not within the compensation range, the controller may maintain the previous virtual limit. In the case in which the point at which the error signal is output is within the compensation range, the controller may update the previous virtual limit. The controller may recognize the point at which the error signal is output as a new physical end, and may set a position compensated for by a first number of pulses based on the newly recognized physical end to a new virtual limit (S400).

As is apparent from the foregoing, according to an embodiment of the present invention, a seat operation range setting system is capable of setting a virtual limit for setting a seat operation range as the result of a contactless sensor sensing a bracket disposed at one side of a lower rail. Even in the case in which impact is applied to a vehicle or a Hall sensor malfunctions, therefore, the seat operation range setting system is capable of setting the virtual limit at a regular position.

According to the embodiment of the present invention, the seat operation range setting system is capable of accurately setting the seat operation range, and therefore it is possible to prevent the seat from being separated from the rail due to a change in the seat operation range even when impact is applied to the vehicle.

According to the embodiment of the present invention, the seat operation range setting system is capable of setting a virtual limit having an error and an external factor applied to the seat reflected therein.

The embodiments of the present invention have been described with reference to the accompanying drawings. However, it will be apparent to those skilled in the art that the present invention may be embodied in specific forms other than those set forth herein without departing from the spirit and essential characteristics of the present invention. Therefore, the above embodiments should be construed in all aspects as illustrative and not restrictive.

What is claimed is:

1. A seat operation range setting system comprising:
a lower rail disposed on a frame mounted to a floor panel of a chassis;
an upper rail installed so as to be slidable along the lower rail;
a contactless sensor connected to the upper rail, the contactless sensor being configured to sense a bracket disposed at one side of the lower rail;
a motor configured to drive the seat;
a Hall sensor configured to output a pulse based on a rotation amount of the motor; and
a controller configured to receive an ON/OFF signal of the contactless sensor and to set a virtual limit of a seat, wherein the controller recognizes a point at which a signal of the contactless sensor is changed from an ON state to an OFF state or a point at which the signal of the contactless sensor is changed from the OFF state to the ON state as a physical end to which the seat is movable, and sets the virtual limit based on the physical end.

2. The seat operation range setting system according to claim 1, wherein, in a case in which a rear virtual limit of the seat is initially set, the controller stores a number of pulses output by the Hall sensor when the seat moves from a physically rearmost position of the seat to the position at which the signal of the contactless sensor is changed from the ON state to the OFF state.

3. The seat operation range setting system according to claim 1, wherein the controller sets a position compensated for by a predetermined first number of pulses based on the physical end as the virtual limit.

4. The seat operation range setting system according to claim 1, wherein
in a case in which the Hall sensor malfunctions, the controller updates the virtual limit when the seat moves from a position ahead of the virtual limit by a predetermined second number of pulses in a direction toward the virtual limit, and the case in which the Hall sensor malfunctions means a case in which the seat reaches the physical end or a case in which the seat is pinched.

5. The seat operation range setting system according to claim 4, wherein
the virtual limit comprises a front virtual limit and a rear virtual limit based on a position of the seat, and
in a case in which one of the front virtual limit and the rear virtual limit is updated, the controller also updates the other of the front virtual limit and the rear virtual limit.

6. The seat operation range setting system according to claim 5, wherein
the controller estimates a distance between the front virtual limit and the rear virtual limit based on a number of pulses output by the Hall sensor, and
in a case in which one of the front virtual limit and the rear virtual limit is updated, the controller also updates the other of the front virtual limit and the rear virtual limit based on the estimated distance between the front virtual limit and the rear virtual limit.

7. The seat operation range setting system according to claim 4, wherein, in a case in which the Hall sensor malfunctions at a point deviating from the position ahead of the virtual limit by the second number of pulses, the controller ignores malfunction of the Hall sensor and maintains a previous virtual limit.

8. The seat operation range setting system according to claim 1, wherein the controller recognizes a point at which the Hall sensor malfunctions as the physical end, and updates a previous virtual limit based on the physical end.

9. The seat operation range setting system according to claim 1, wherein the contactless sensor outputs an ON signal upon sensing the bracket.

10. The seat operation range setting system according to claim 1, wherein
the bracket has a shape extending in a direction in which the lower rail extends, and
an extension length of the bracket is less than an extension length of the lower rail.

11. The seat operation range setting system according to claim 1, wherein the controller sets a distance between a front virtual limit and a rear virtual limit based on an extension length of the bracket.

12. The seat operation range setting system according to claim 1, wherein
the controller sets a range within which the contactless sensor senses the bracket as a seat operation range, and
the controller sets the virtual limit based on the seat operation range.

13. The seat operation range setting system according to claim 12, wherein the seat operation range means a physical end to which the seat is movable.

* * * * *